(12) United States Patent
Choi et al.

(10) Patent No.: US 8,966,774 B2
(45) Date of Patent: Mar. 3, 2015

(54) APPARATUS FOR MARKING SECTION FOR GEOLOGICAL SURVEY

(71) Applicants: Sung-Ja Choi, Daejeon (KR); Il-Mo Kang, Seoul (KR)

(72) Inventors: Sung-Ja Choi, Daejeon (KR); Il-Mo Kang, Seoul (KR)

(73) Assignee: Korea Institute of Geoscience and Mineral Resources, Daejeon (KR)

( * ) Notice: Subject to any disclaimer, the term of this patent is extended or adjusted under 35 U.S.C. 154(b) by 241 days.

(21) Appl. No.: 13/622,100

(22) Filed: Sep. 18, 2012

(65) Prior Publication Data

US 2013/0312654 A1    Nov. 28, 2013

(30) Foreign Application Priority Data

May 25, 2012    (KR) ......................... 10-2012-0055831

(51) Int. Cl.
*G01C 15/06* (2006.01)
*G01C 15/04* (2006.01)

(52) U.S. Cl.
CPC ................ *G01C 15/06* (2013.01); *G01C 15/04* (2013.01)
USPC .......................................................... 33/1 G

(58) Field of Classification Search
USPC .................................................. 33/1 G, 764
See application file for complete search history.

(56) References Cited

U.S. PATENT DOCUMENTS

| | | | | |
|---|---|---|---|---|
| 1,933,163 A * | 10/1933 | Coplen | ......................... | 242/404 |
| 2,555,457 A * | 6/1951 | Rose | ......................... | 242/397.5 |
| 3,338,536 A * | 8/1967 | Hull et al. | .................. | 242/388.6 |
| 3,558,101 A * | 1/1971 | Ward | ............................. | 242/395 |
| 3,979,833 A * | 9/1976 | Grundman | ...................... | 33/701 |
| 4,101,088 A * | 7/1978 | Stauth | ........................ | 242/396.1 |
| 4,106,203 A * | 8/1978 | Sikma et al. | ..................... | 33/413 |
| 4,381,607 A * | 5/1983 | Place | .............................. | 33/1 G |
| 4,565,005 A * | 1/1986 | Naka | .............................. | 33/1 G |
| 5,107,595 A * | 4/1992 | Stay et al. | ........................ | 33/1 G |
| 5,657,548 A * | 8/1997 | Kellar, Sr. | ......................... | 33/405 |
| 5,778,546 A * | 7/1998 | Williamson | ..................... | 33/405 |
| 5,974,720 A * | 11/1999 | Bowling | ............................ | 43/3 |
| 6,212,782 B1 * | 4/2001 | Eisenmenger | .................. | 33/1 G |
| 6,754,974 B2 * | 6/2004 | Bassolino et al. | ............... | 33/759 |
| 6,978,553 B2 * | 12/2005 | Doublet | ............................ | 33/756 |
| 7,984,562 B2 * | 7/2011 | Redmond et al. | ............... | 33/562 |
| 2002/0007561 A1 * | 1/2002 | Malizia | ........................... | 33/528 |
| 2004/0006935 A1 * | 1/2004 | Moorhead | ........................ | 52/155 |
| 2005/0072009 A1 * | 4/2005 | Doublet | ........................... | 33/1 G |
| 2005/0223582 A1 * | 10/2005 | Baugh | ............................. | 33/764 |
| 2006/0070249 A1 * | 4/2006 | Wallach et al. | ................. | 33/1 G |
| 2008/0256810 A1 * | 10/2008 | Akihary | .......................... | 33/1 N |

* cited by examiner

*Primary Examiner* — Yaritza Guadalupe-McCall
(74) *Attorney, Agent, or Firm* — Kile Park Reed & Houtteman PLLC

(57) ABSTRACT

Provided are embodiments of a section marking apparatus and method for dividing a geological survey site into one or more sections. In some embodiments, the section marking apparatus includes a case part, a fixing shaft part, a section marking part, and a driving pin part. The fixing shaft part is accommodated in the case part. The section marking part is coupled to the fixing shaft part, received in the case part, and has a marker string configured to be extracted to the outside of the case part. The driving pin part is coupled to the fixing shaft part and configured to be driven into a ground surface to secure the section marking apparatus to the ground surface. Accordingly, the section marking apparatus can be used to divide a site when the ground is flat or when the ground is uneven and/or has a slope.

19 Claims, 12 Drawing Sheets

APPARATUS FOR MARKING SECTION FOR GEOLOGICAL SURVEY

CROSS-REFERENCE TO RELATED APPLICATION

This application claims priority to Korean Patent Application No. 10-2012-0055831 filed on May 25, 2012, and all the benefits accruing therefrom under 35 U.S.C. §119, the contents of which are incorporated by reference in their entirety.

BACKGROUND

A geological survey is a survey performed for identifying a distribution of rocks and strata, a relation between rock and strata, a geologic age, and geological structure in a certain area. The objective of the geological survey is to provide preliminary data for resource development, rational utilization of territory, and establishment of geological systems. Also, in building construction, a geological survey can be done as an advance preparation for identifying geological features of a building construction site. Prior to beginning a geological survey, a geological survey area is selected, a geological survey site is divided into sections, and the sections are marked.

In a conventional method for dividing a geological survey site into sections and marking the sections, a plurality of long posts are driven into the ground and a band is put around the posts to indicate the sections. Such a conventional method is disadvantageous since a process of marking a section is not easy, a lot of time is required to mark a section, and long posts are bent or broken when driven into the ground, making it difficult to drive the long posts into the ground. In addition, in a state where a ground surface is uneven or has a slope, it is difficult to judge where the posts have to be driven, and thus a lot of time is required to mark a section. Also, after removing the posts used for indicating the section and bands put around the posts, the posts and the bands are discarded so that industrial waste is produced.

SUMMARY

The present disclosure provides a section marking apparatus and method for geological survey. The section marking apparatus can rapidly and easily divide a geological survey site and mark site sections both when the ground surface is flat and when it is uneven or has a slope that makes it difficult to determine a section area. The section marking apparatus can be installed and removed easily, and can be secured horizontally to a ground surface without any inclination.

In accordance with an exemplary embodiment, a section marking apparatus for geological survey divides a geological survey site into sections and marks the sections. The section marking apparatus for geological survey may include a case part; a fixing shaft part accommodated in the case part; a section marking part accommodated in the case part, coupled to the fixing shaft part, and having a marker string extracted to the outside of the case part for guidance to an installation location of another section marking apparatus; and a driving pin part coupled to the fixing shaft part and driven into the ground surface to secure the section marking apparatus to the ground surface when the section marking apparatus is installed.

In an embodiment, the case part may have an internal space in which the fixing shaft part and the section marking part can be received. The fixing shaft part includes a partition dividing the internal space of the case part into two spaces, an upper axial pipe protruding upward from an upper surface of the partition, and a lower axial pipe protruding downward from a lower surface of the partition. The section marking part may include a first section marking part accommodated in the case part and disposed above the partition, and a second section marking part accommodated in the case part and disposed below the partition.

The driving pin part may include a striking rod coupled to the partition, the upper axial pipe, and the lower axial pipe, a supporting plate provided below the striking rod to support a bottom part of the case part when the striking rod is coupled to the partition, the upper axial pipe, and the lower axial pipe, and a driving pin extending vertically downward from a lower surface of the supporting plate.

The first section marking part may include a first drum coupled to the upper axial pipe and accommodated in the case part; a first marker string wound around the first drum and having one end unwound from the first drum and extracted to the outside of the case part; and a first restoring spring provided in the first drum and connected to the first marker string to wind the first marker string extracted to the outside of the case part around the first drum through the restoration force thereof. Also, the second section marking part may include a second drum coupled to the lower axial pipe and accommodated in the case part; a second marker string wound around the second drum and having one end unwound from the second drum and extracted to the outside of the case part; and a second restoring spring provided in the second drum and connected to the second marker string to wind the second marker string extracted to the outside of the case part around the second drum through the restoration force thereof.

The case part may include a first extraction hole for extracting the first marker string and a second extraction hole for extracting the second marker string.

In another embodiment, the section marking apparatus may include a connecting part provided on the case part, and the first marker string and the second marker string may connect to respective neighboring section marking apparatuses when the section marking apparatus is installed.

The connecting part may include a first connecting hook provided at a first end portion of the first marker string extracted to the outside of the case part and a second connecting hook provided at a second end portion of the second marker string extracted to the outside of the case part. The connecting part may also include a first hook connecting ring and a second hook connecting ring provided on an outer surface of the case part to allow the first connecting hook or the second connecting hook of another neighboring section marking apparatus to be coupled thereto when the section marking apparatus is installed.

In still another embodiment, the section marking apparatus may include a securing bolt extending through the side part of the case part and coupled to the partition of the fixing shaft part.

In still another embodiment, the section marking apparatus may include a level adjusting unit coupled to the side part of the case part to allow the section marking apparatus to be secured to the ground surface in a state where the section marking apparatus is not inclined but parallel to a horizontal plane when the section marking apparatus is provided on the ground surface.

The level adjusting unit may include a first level provided on a side part of the case part in a state where one end portion of the first level is directed in a first direction, and a second level provided on the same or another side part of the case part in a state where one end portion of the second level is directed in a second direction.

In addition to the above, some embodiments of the present invention provide a section marking apparatus for dividing a geological survey site into one or more sections, where the apparatus includes: (a) a case part having a first internal space formed therein; (b) a fixing shaft part accommodated in the first internal space to divide the first internal space; (c) a first section marking part accommodated in the first internal space and disposed above the fixing shaft part, the first section marking part including a first marker string configured to be extracted to the outside of the case part; (d) a second section marking part accommodated in the first internal space and disposed below the fixing shaft part, the second section marking part including a second marker string configured to be extracted to the outside of the case part; and (e) a driving pin part including a striking rod extending through the case part and the fixing shaft part, a supporting plate formed at one end portion of the striking rod to support a bottom part of the case part, and a driving pin extending from the supporting plate and configured to be inserted into the site.

Other embodiments of the present invention provide a section marking apparatus that includes: (a) a case part having a first extraction hole and defining a first internal space; (b) a fixing shaft part accommodated in the first internal space and having an upper axial pipe; (c) a first section marking part accommodated in the first internal space and having: (i) a first drum including a first winding part and defining a hole through which the upper axial pipe extends; (ii) a first marker string wound around an outer surface of the first winding part and configured to be extracted to the outside of the case part through the first extraction hole; and (iii) a first restoring spring accommodated in a space formed by an inner surface of the first winding part and having a first end portion coupled to the upper axial pipe and a second end portion coupled to the first marker string.

Still other embodiments of the present invention provide a method for dividing a site into one or more sections using a first section marking apparatus, the method including: (a) extracting a first marker string from a first extraction hole in a case part of the first section marking apparatus, where the case part accommodates a first drum and a first restoring spring, where the first restoring spring is coupled to the first marker string, and where the extracting the first marker string includes unwinding the first marker string from around an outer surface of the first drum by overcoming a first restoration force of the first restoring spring; and (b) connecting an end portion of the first marker string to a second section marking apparatus.

BRIEF DESCRIPTION OF THE DRAWINGS

Exemplary embodiments can be understood in more detail from the following description taken in conjunction with the accompanying drawings, in which.

DETAILED DESCRIPTION OF EMBODIMENTS

Figure 1:
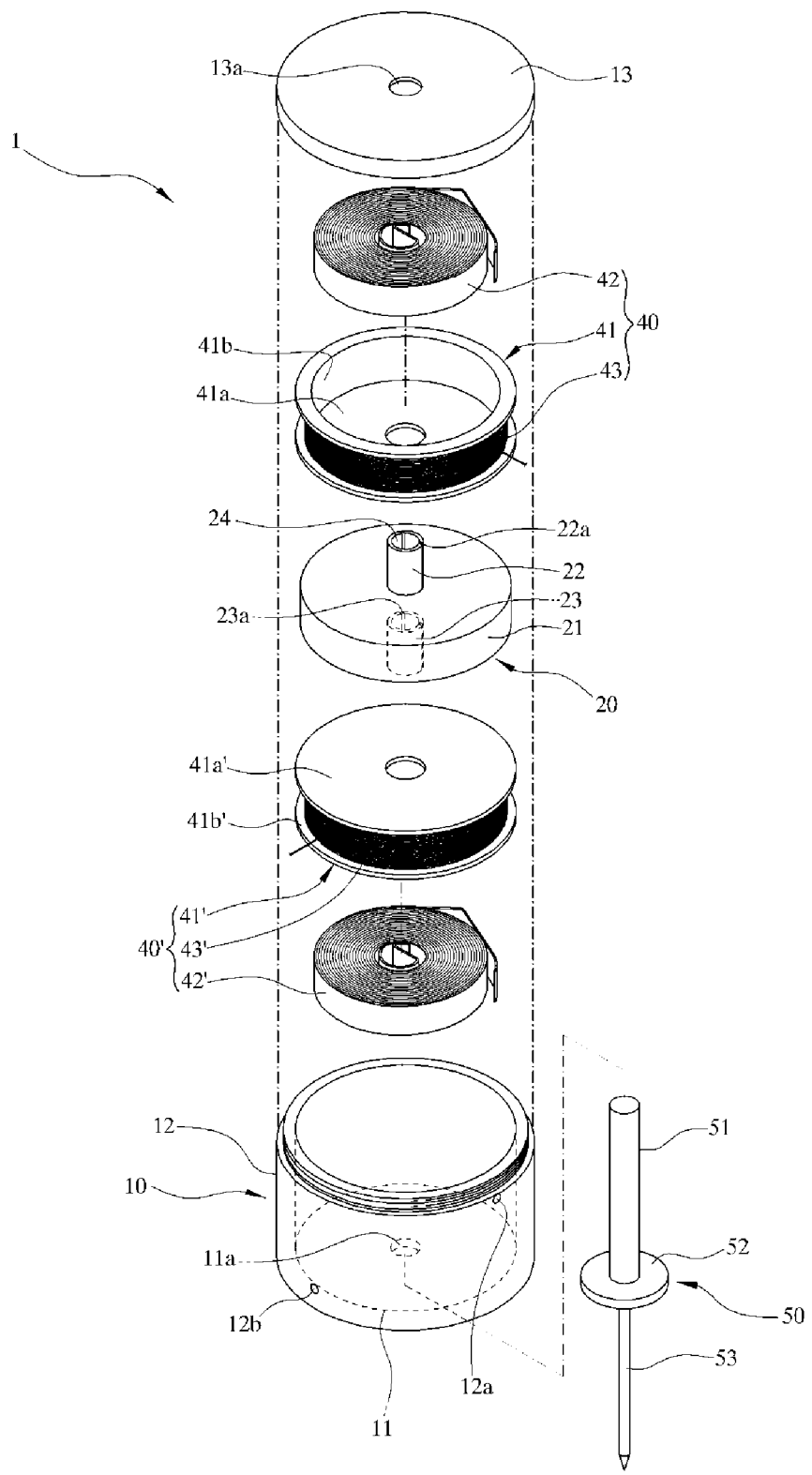
FIG. 1 is an exploded perspective view showing a structure of a section marking apparatus for geological survey according to one embodiment of the present invention.

Exemplary embodiments will be described in detail with reference to the accompanying drawings. Since the present disclosure may have modified embodiments, preferred embodiments are illustrated in the drawings and are described in the detailed description of the invention. However, this does not limit the present disclosure within specific embodiments and it should be understood that the present disclosure covers all the modifications, equivalents, and replacements within the idea and technical scope of the present disclosure. In the drawings, the dimensions and size of each structure may be exaggerated, omitted, or schematically illustrated for convenience in description and clarity.

It will be understood that although the terms of first and second are used herein to describe various elements, these elements should not be limited by these terms. Terms are only used to distinguish one component from other components. Therefore, a component referred to as a first component in one embodiment can be referred to as a second component in another embodiment.

In the following description, the technical terms are used only for explaining a specific exemplary embodiment while not limiting the present disclosure. The terms of a singular form may include plural forms unless referred to the contrary. The meaning of 'include', 'have', or 'comprise' specifies a property, a step, a function, an element, or a combination thereof, but does not exclude other properties, steps, functions, elements, or combinations thereof.

Unless terms used in the present description are defined differently, the terms should be construed as having the one or more meanings known to those skilled in the art. Terms that are generally used and have been defined in dictionaries should be construed as having meanings matched with contextual meanings in the art. In this description, unless defined clearly, terms are not ideally or excessively construed as formal meanings.

Figure 2:
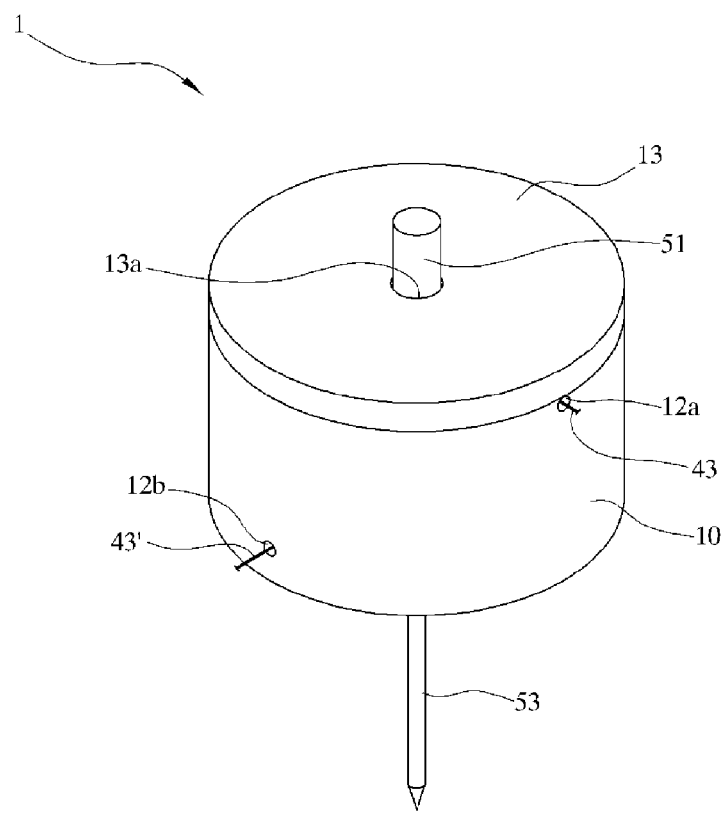
FIG. 2 is a perspective view showing a coupled state of the apparatus of FIG. 1.
Figure 3:
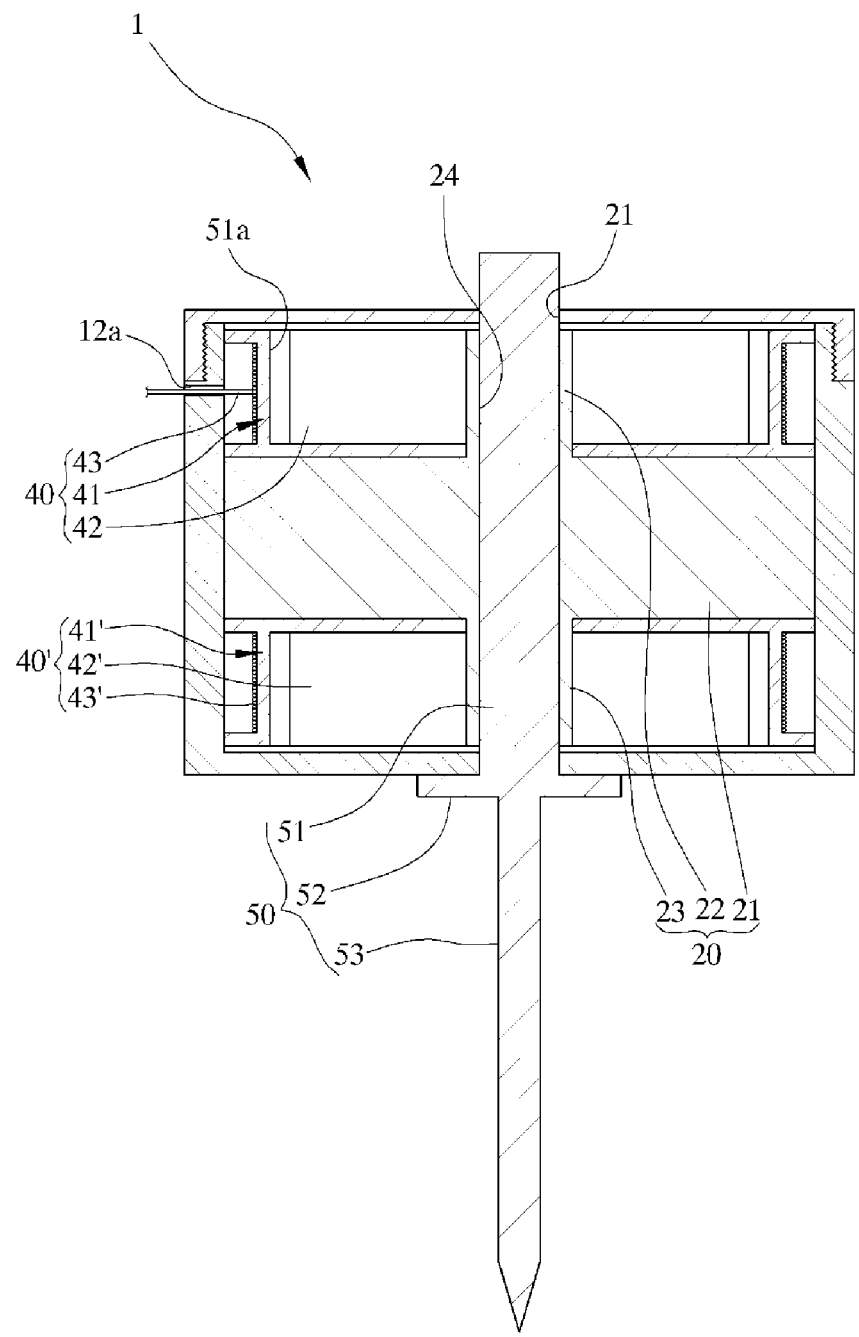
FIG. 3 is a cross-section through the apparatus of FIG. 2.
Figure 4:
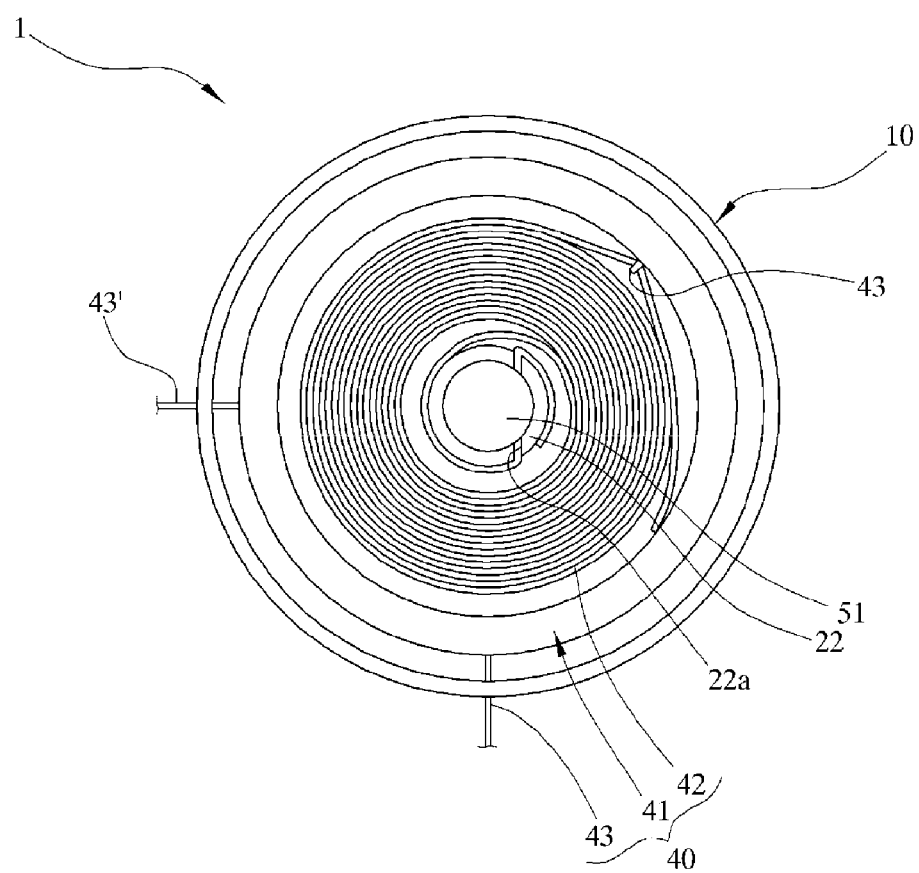
FIG. 4 is a plan view of the apparatus of FIG. 2 from which a cover is removed.

FIG. 1 is an exploded perspective view showing a structure of a section marking apparatus for geological survey in accordance with an exemplary embodiment. FIG. 2 is a perspective view showing a coupled state of the apparatus of FIG. 1. FIG. 3 is a cross-section through the apparatus of FIG. 2. FIG. 4 is a plan view of the apparatus of FIG. 2 from which a cover is removed.

Referring to FIG. 1 to FIG. 4, a section marking apparatus 1 for a geological survey in accordance with an exemplary embodiment may include a case part 10, a fixing shaft part 20, section marking parts 40 and 40', and a driving pin part 50.

The fixing shaft part 20 and the section marking parts 40 and 40' may be accommodated in the case part 10. For example, the case part 10 may include a bottom part 11, a side part 12, and a cover part 13 for forming an internal space in which the fixing shaft part 20 and the section marking parts 40 and 40' are received.

The bottom part 11 may have a circular plate-shape or a rectangular plate-shape. An insertion hole 11a may be formed at a center of the bottom part 11 to allow a striking rod 51 of the driving pin part 50 to be inserted into the insertion hole 11a.

The side part 12 may extend vertically upward from an edge of the bottom part 11. For example, the side part 12 can be formed integrally with the bottom part 11. The side part 12 may be provided with a first extraction hole 12a and a second extraction hole 12b. The first extraction hole 12a enables a first marker string 43 of the first section marking part 40 of the section marking parts 40 and 40' to be extracted to the outside, and the second extraction hole 12b enables a second marker string 43' of the second section marking part 40' of the section marking parts 40 and 40' to be extracted to the outside. The first extraction hole 12a and the second extraction hole 12b are formed on the side part 12 such that the first marker string 43 and the second marker string 43' can be extracted in a state where two strings are perpendicular to each other. The second extraction hole 12b may be formed below the first extraction hole 12a.

The cover part 13 is opposite to the bottom part 11 and coupled detachably to an upper end of the side part 12 to enable the internal space of the case part 10 to be opened and sealed. For example, the cover part 13 can be coupled to the side part 12 by a screw-coupling. In this case, thread portions which may be screw-coupled to each other can be formed on an upper portion of an outer circumference surface of the side part 12 and an inner circumference surface of the cover part 13, respectively. A hole 13a may be formed at a center of the cover part 13 to enable the striking rod 51 to pass through the hole 13a.

The above case part 10 may be formed of material such as metal, plastic, or the like. However, the material to be used to form the case part 10 is not limited thereto as long as it has a certain strength.

The fixing shaft part 20 may divide the internal space of the case part 10 into two spaces to enable the section marking parts 40 and 40' to be accommodated in the fixed places. The fixing shaft part 20 may include a partition 21, an upper axial pipe 22, and a lower axial pipe 23.

The partition 21 may divide the internal space of the case part 10 into two spaces. The partition 21 may have a plate shape having a dimension which is virtually the same as a cross-section of the internal space of the case part 10.

The upper axial pipe 22 and the lower axial pipe 23 may be accommodated in the internal space of the case part 10 to allow central portions of the first section marking part 40 and the second section marking part 40' to coincide with a center portion of the partition 21. The upper axial pipe 22 may protrude upward from an upper surface of the partition 21, and the lower axial pipe 23 may protrude downward from a lower surface of the partition 21. Holes 24 through which the striking rod 51 may pass may be formed on the partition 21, the upper axial pipe 22, and the lower axial pipe 23, respectively, the holes 24 being in communication with each other. The upper axial pipe 22 may be provided with a first cut-out section 22a, and the lower axial pipe 23 may be provided with a second cut-out section 23a. The first cut-out section 22a enables one end of a first restoring spring 42 mounted to the first section marking part 40 of the section marking parts 40 and 40' to be secured to the upper axial pipe 22, and the second cut-out section 23a enables one end of a second restoring spring 42' mounted to the second section marking part 40' of the section marking parts 40 and 40' to be secured to the lower axial pipe 23.

The fixing shaft part 20 described above may be formed of material such as metal, plastic, or the like. However, material employed for forming the fixing shaft part 20 is not limited thereto as long as it has a certain strength. In addition, material employed for forming the fixing shaft part 20 may be the same as or different from that employed for forming the case part 10.

The section marking parts 40 and 40' may divide a geological survey site into square sections or rectangular sections and indicate the divided sections. The section marking parts 40 and 40' may include the first section marking part 40 and the second section marking part 40', which are accommodated in the internal space of the case part 10. The first and second section marking parts 40 and 40' may be disposed across the partition 21 from each other.

The first section marking part 40 may be accommodated in an upper space of the internal space of the case part 10 which is divided into two spaces by the partition 21. The first section marking part 40 may include a first drum 41, the first restoring spring 42, and the first marker string 43.

The first drum 41 may accommodate the first restoring spring 42 and the first marker string 43 may be wound around the first drum 41. As one example, in order to accommodate the first restoring spring 42 and wind the first marker string 43, the first drum 41 may include a first bottom part 41a and a first winding part 41b. The first bottom part 41a may be a plate having a circular shape, and a hole through which the upper axial pipe 22 passes may be formed at a center of the first bottom part 41a. The first drum 41 may be rotated with respect to the upper axial pipe 22 inserted into the hole of the first bottom part 41a and acting as a rotational axis. The first winding part 41b is formed as a side surface of the first drum 41 and may extend upward perpendicularly from an edge of the first bottom part 41a. As one example, the first bottom part 41a and the first winding part 41b may be formed integrally with each other. The first winding part 41b may have a cylindrical pipe shape, and an internal space of the first winding part 41b may have an opened upper end to enable the first restoring spring 42 to be inserted into the internal space of the first winding part 41b. An insertion hole may be formed on one side of the first winding part 41b for inserting the first marker string 43 into an inner space of the first winding part 41b. The first drum 41 may be formed of material such as metal, plastic, or the like. However, the material employed for forming the first drum 41 is not limited as long as it has a certain strength, and the first bottom part 41a and the first winding part 41b may be formed of the same material or different materials.

The first restoring spring 42 may make the first marker string 43 unwound from the first drum 41 be wound around the first drum 41 again. The first restoring spring 42 may be received in the internal space of the first drum 41. For example a conventional spiral spring may be utilized as the first restoring spring 42. An inner end portion of the first restoring spring 42 may be secured to the first cut-out section 22a of the upper axial pipe 22, and an outer end portion of the first restoring spring 42 may be coupled to one end portion of the first marker string 43 inserted through the hole formed on the first winding part 41b.

The first marker string 43 may have a certain length and may be wound around the first drum 41. For example, in order to wind the first marker string 43 around the first drum 41, one end of the first marker string 43 may be inserted into the insertion hole formed on the winding part 41b of the first drum 41, and then fixed to the outer end portion of the first restoring spring 42. The other end of the first marker string 43 may be extracted to the outside of the case part 10 through the first extraction hole 12a formed on the side part 12 of the case part 10. In a case where the first marker string 43 is connected to the first drum 41 and the first restoring spring 42 as described above, when the first marker string 43 may be pulled and extracted to the outside of the case part 10, the first drum 41 may be rotated about the upper axial pipe 22 so that the first marker string 43 may be unwound from the first drum 41, and if the pulled first marker string 43 is released, the first marker string 43 may be wound again around the first drum 41 by the restoration force of the first restoring spring 42.

The second section marking part 40' may be accommodated in a lower space of the internal space of the case part 10 which is divided into two spaces by the partition 21. The second section marking part 40' may include a second drum 41', the second restoring spring 42', and the second marker string 43'.

The second drum 41' may accommodate the second restoring spring 42', and the second marker string 43' may be wound around the second drum 41'. As one example, in order to accommodate the second restoring spring 42' and wind the second marker string 43', the second drum 41' may include a second bottom part 41a' and a second winding part 41b'. The second bottom part 41a' may be a plate having a circular shape, and a hole through which the lower axial pipe 23 passes may be formed at a center of the second bottom part 41a'. The second winding part 41b' is formed as a side surface of the second drum 41' and may extend downward perpendicularly from an edge of the second bottom part 41a'. As one example, the second bottom part 41a' and the second winding part 41b' may be formed integrally with each other. The second winding part 41b' may have a cylindrical pipe shape, and an internal space of the second winding part 41b' may have an opened lower end to enable the second restoring spring 42' to be inserted into the internal space of the second winding part 41b'. An insertion hole may be formed on one side of the second winding part 41b' for inserting the second marker string 43' into an inner space of the second winding part 41b'. The second drum 41' may be formed of material such as metal, plastic, or the like. However, the material employed for forming the second drum 41' is not limited as long as it has a certain strength, and the second bottom part 41a' and the second winding part 41b' may be formed of the same material or different materials.

The second restoring spring 42' may make the second marker string 43' unwound from the second drum 41' be wound around the second drum 41' again. The second restoring spring 42' may be received in the internal space of the second drum 41'. A conventional spiral spring may be utilized as the second restoring spring 42'. An inner end portion of the second restoring spring 42' may be secured to the second cut-out section 23a of the lower axial pipe 23, and an outer end portion of the second restoring spring 42' may be coupled to one end portion of the second marker string 43' inserted through the hole formed on the second winding part 41b'.

The second marker string 43' may have a certain length and may be wound around the second drum 41'. For example, in order to wind the second marker string 43' around the second drum 41', one end of the second marker string 43' may be inserted into the insertion hole formed on the winding part 41b' of the second drum 41', and then fixed to the outer end portion of the second restoring spring 42'. The other end of the second marker string 43' may be extracted to the outside of the case part 10 through the second extraction hole 12b formed on the side part 12 of the case part 10. In a case where the second marker string 43' is connected to the second drum 41' and the second restoring spring 42' as described above, when the second marker string 43' is pulled and extracted to the outside of the case part 10, the second drum 41' is rotated about the lower axial pipe 23 so that the second marker string 43' is unwound from the second drum 41', and if the pulled second marker string 43' is released, the second marker string 43' may be wound again around the second drum 41' by the restoration force of the second restoring spring 42'.

The driving pin part 50 allows the section marking apparatus 1 to be secured to a ground surface. The driving pin part 50 may be coupled to the fixing shaft part 20 and the case part 10. As one example, the driving pin part 50 is coupled to the fixing shaft part 20 and the case part 10, and may include the striking rod 51, a supporting plate 52, and a driving pin 53 to secure the section marking apparatus 1 to a ground surface.

The striking rod 51 may be struck by a hammer to drive the driving pin 53 into the ground surface when the section marking apparatus 1 is fixed to the ground surface. The striking rod 51 may be a vertically elongated rod having a dimension which is virtually the same as a section of the holes 24 formed on the partition 21, the upper axial pipe 22, and the lower axial pipe 23. The striking rod 51 may be forcibly inserted into the insertion hole 11a formed on the lower part of the case part 10 and the holes 24 formed on the partition 21.

The supporting plate 52 may be disposed below the striking rod 51 to restrict a length of the striking rod 51 which is forcibly inserted into the fixing shaft part 20 and prevent the case part 10 from moving downward along the striking rod 51 due to its own weight or an external impact. The supporting plate 52 may be a plate having a circular shape or a polygonal shape such as a quadrangle, hexagon, or the like. The supporting plate 52 may be supported on the bottom part 11 of the case part 10 when the striking rod 51 is coupled to the fixing shaft part 20.

The driving pin 53 may extend downward perpendicularly from a center of a lower surface of the supporting plate 52. The driving pin 53 may have a pointed end so that the driving pin 53 may be driven into the ground surface, and may have a certain strength and a diameter smaller that the striking rod 51 and the supporting plate 52.

The driving pin 53 as described above may be formed of material such as metal having a length by which the driving pin 53 may withstand an external impact. Provided the driving pin 53 has a certain length which is sufficient to be driven into the ground surface, the material employed for forming the driving pin 53 is not limited.

Figure 5:
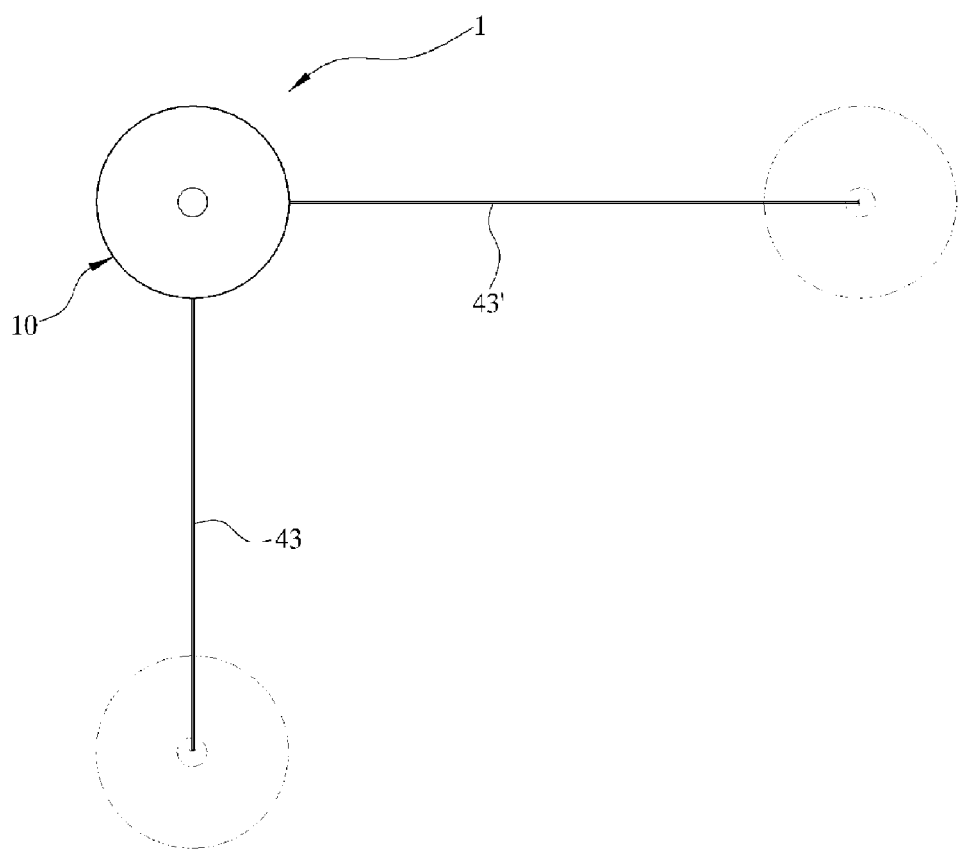
FIG. 5 is a plan view showing a state of a section marking apparatus for geological survey according to one embodiment of the present invention in which a marker string is extracted.

When the section marking apparatus 1 for a geological survey according to the first embodiment of the present invention is secured to the ground surface for dividing the site and marking the sections, the striking rod 51 is stricken by a hammer and the striking pin 53 is driven into the ground surface to enable the section marking apparatus 1 to be secured to the ground surface. FIG. 5 is a plan view showing a state of the section marking apparatus 1 for geological survey according to the first embodiment of the present invention in which the marker string is extracted. Referring to FIG. 5, once the section marking apparatus 1 is secured to the ground surface, the first marker string 43 and the second marker string 43' are extracted to the outside of the case part 10. That is, the first marker string 43 and the second marker string 43' are extracted to front areas of the first extraction hole 12a and the second extraction hole 12b so that the first extraction hole 12a and the second extraction hole 12b guide a location to which another section marking apparatus 1 will be secured. Accordingly, the securing location of another section marking apparatus 1 may be easily recognized. Due to the above, in any case where the ground surface is even and a height of the ground surface is not constant, that is, in a case where the ground surface is uneven or has a slope that makes it difficult to determine a section area, the processes for dividing the geological survey site and indicating sections may be rapidly executed.

Figure 6:
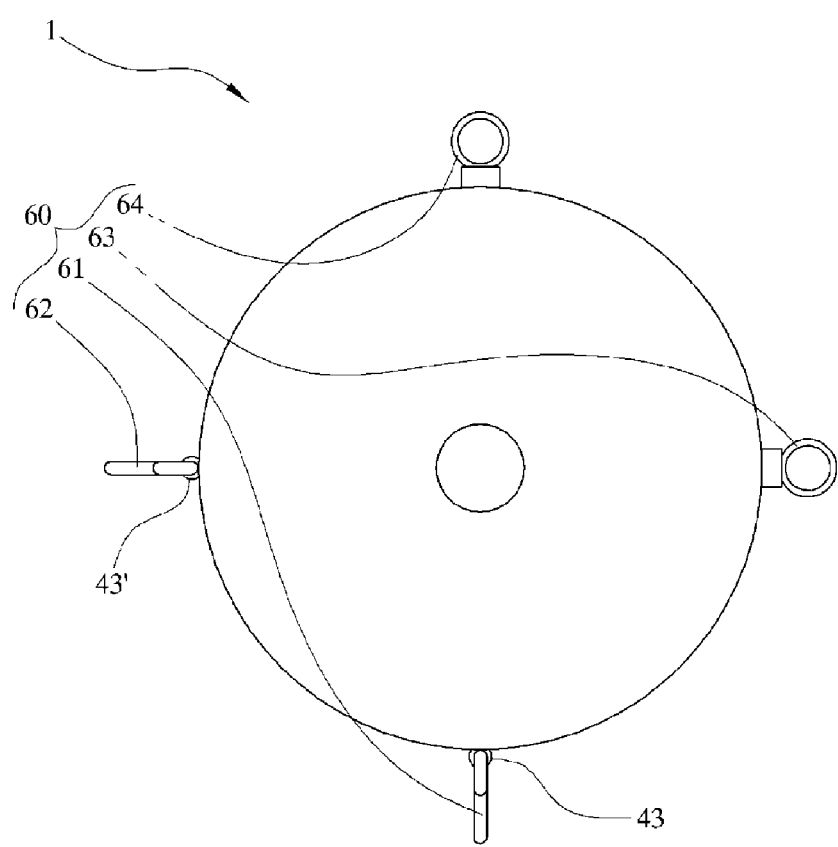
FIG. 6 is a plan view illustrating a structure of a section marking apparatus for geological survey according to another embodiment of the present invention.
Figure 7:
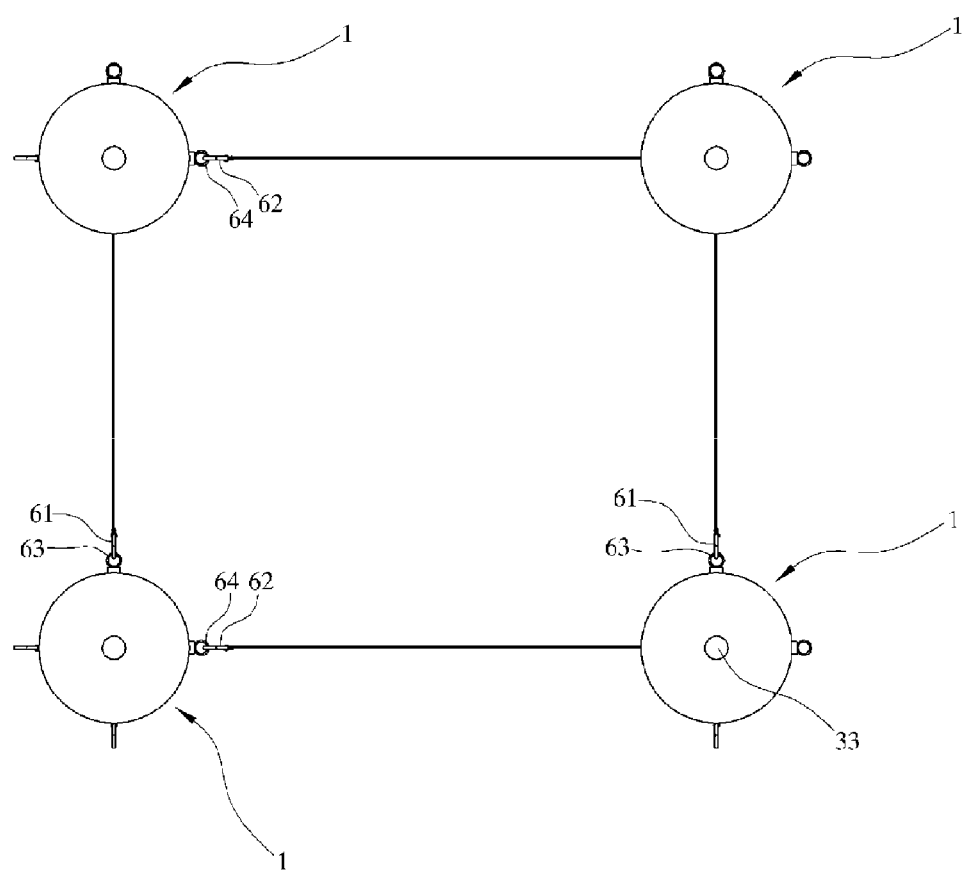
FIG. 7 is a plan view showing a plurality of the apparatuses to mark a section for a geological survey shown in FIG. 6 connected to each other.

FIG. 6 is a plan view illustrating a structure of the section marking apparatus 1 for geological survey in accordance with another exemplary embodiment. FIG. 7 is a plan view showing a plurality of the apparatus to mark a section for a geological survey shown in FIG. 6 connected to each other.

Referring to FIG. 6 and FIG. 7, the section marking apparatus 1 for a geological survey may further include a connecting part 60.

When the section marking apparatus 1 is installed on the ground surface, the connecting part 60 enables the first marker string 43 and the second marker string 43' to be connected to another neighboring the section marking apparatus 1. For example, the connecting part 60 may include a first connecting hook 61, a second connecting hook 62, a first hook connecting ring 63, and a second hook connecting ring 64.

The first connecting hook 61 may be provided at one end of the first marker string 43 extracted through the first extraction hole 12a of the case part 10, and the second connecting hook 62 may be provided at one end of the second marker string 43' extracted through the second extraction hole 12b of the case part 10.

The first connecting hook 61 and the second connecting hook 62 of the neighboring apparatuses 1 to mark a section may be secured to the first hook connecting ring 63 and the second hook connecting ring 64, respectively. The first hook connecting ring 63 and the second hook connecting ring 64 may be provided on the side part 12 of the case part 10. The first hook connecting ring 63 may be provided at a location which is opposite to the second connecting hook 62, and the second hook connecting ring 64 may be provided at a location which is opposite to the first connecting hook 61.

In a case where the section marking apparatus 1 is further provided with the connecting part 60 as described above, as shown in FIG. 7, the first marker string 43 and the second marker string 43' of each section marking apparatus may be connected to a neighboring section marking apparatus in a state where the section marking apparatuses are fixed to the ground surface.

Figure 8:
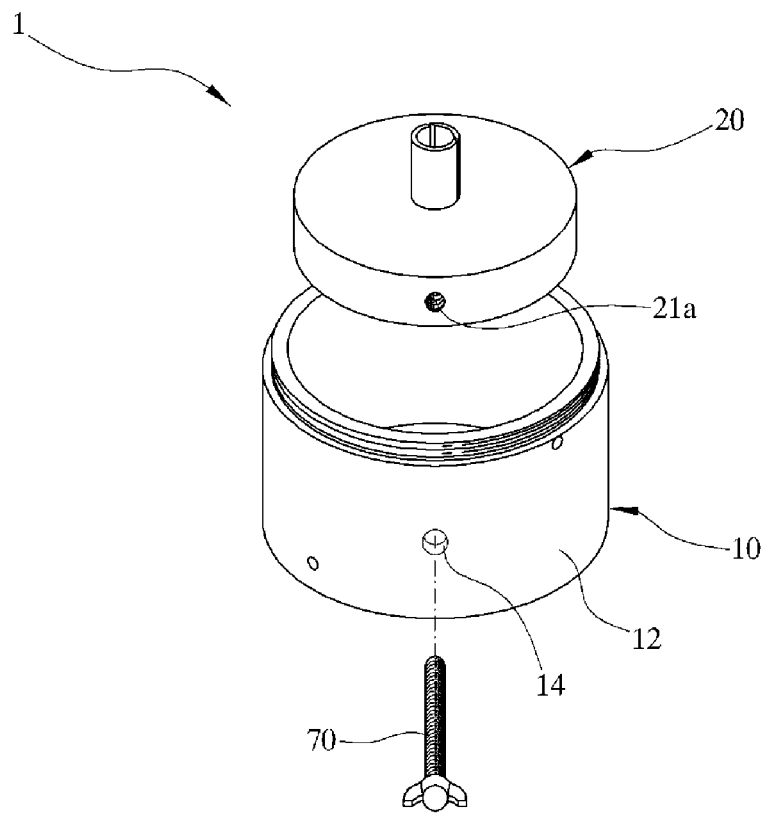
FIG. 8 is an exploded perspective view of a part of a section marking apparatus for geological survey according to yet another embodiment of the present invention.
Figure 9:
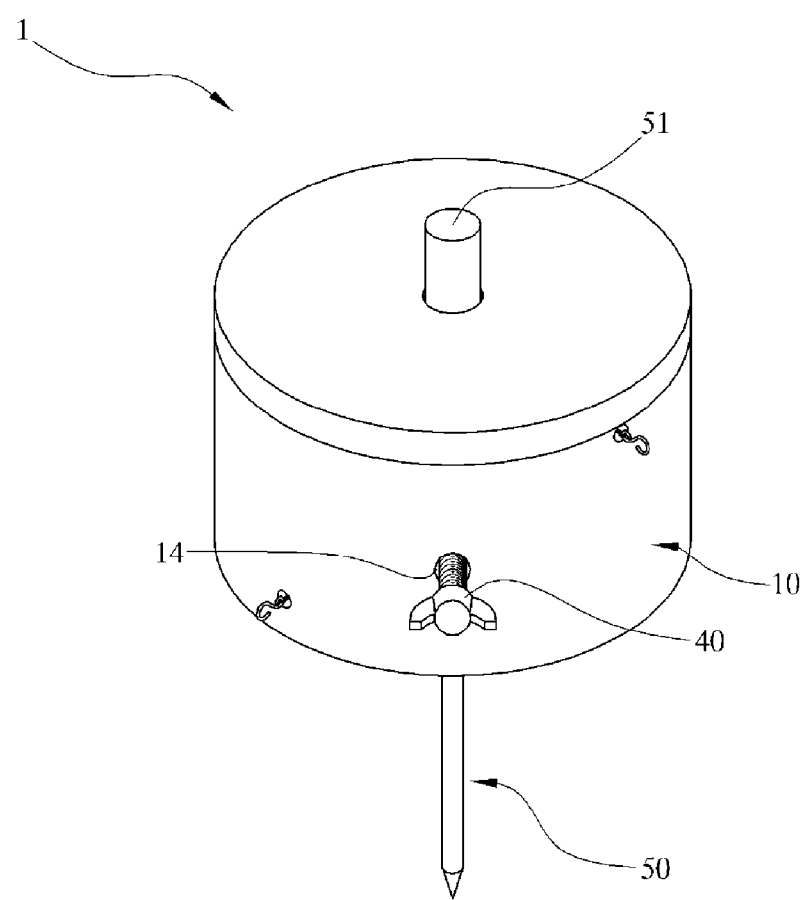
FIG. 9 is a perspective view of a section marking apparatus for geological survey to which a securing bolt shown in FIG. 8 is coupled.

FIG. 8 is an exploded perspective view for illustrating a structure of a section marking apparatus 1 for geological survey in accordance with still another embodiment. FIG. 9 is a perspective view of a section marking apparatus 1 for geological survey to which a securing bolt shown in FIG. 8 is coupled.

Referring to FIG. 8 and FIG. 9, the section marking apparatus 1 for a geological survey may further include a securing bolt 70.

The securing bolt 70 may couple the case part 10 with the fixing shaft part 20. As one example, a through hole 14 through which the securing bolt 70 may pass may be formed on the side part 12 of the case part 10, and the partition 21 of the fixing shaft part 20 may have a threaded hole 21a formed thereon. Here, the through hole 14 corresponds to this threaded hole 21a, and the securing bolt 70 passing through the side part 12 of the case part 10 may be screw-coupled to the threaded hole 21a. In a case where the case part 10 and the fixing shaft part 20 are coupled to each other by the securing bolt 70 as described above, in a state where the fixing shaft part 20 is fixed at a predetermined place, the fixing shaft part 20 may be accommodated in the internal space of the case part 10.

Figure 10:
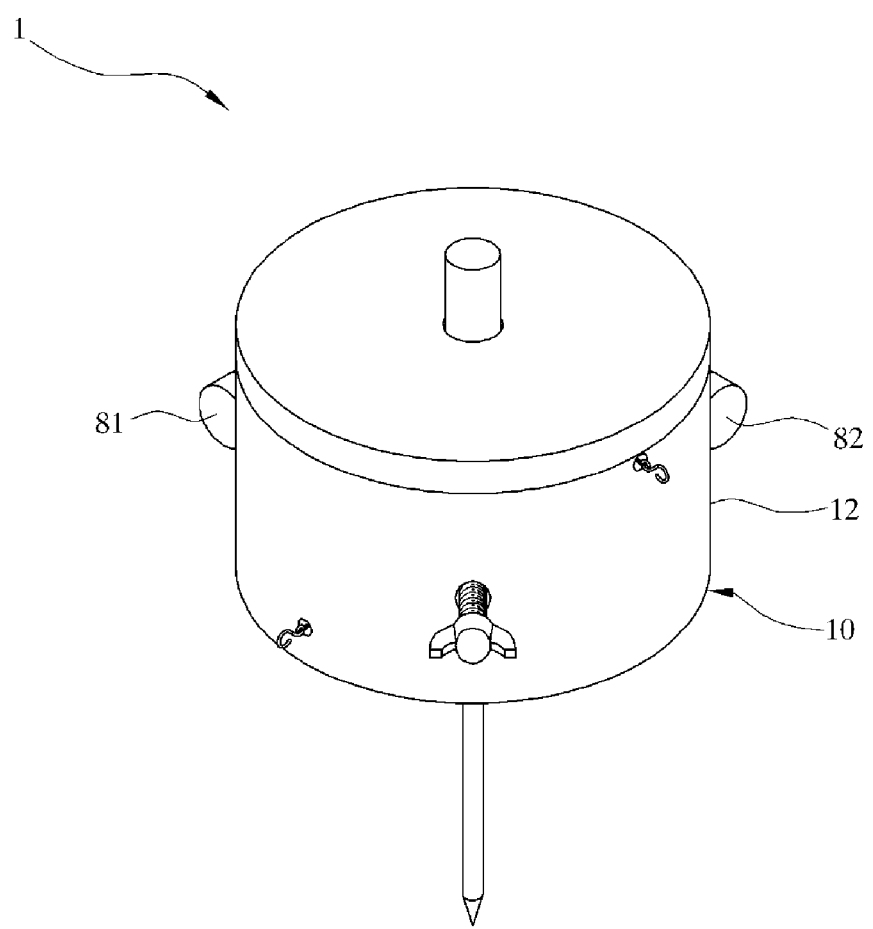
FIG. 10 is a perspective view showing a structure of a section marking apparatus for geological survey according to yet another embodiment of the present invention.
Figure 11:
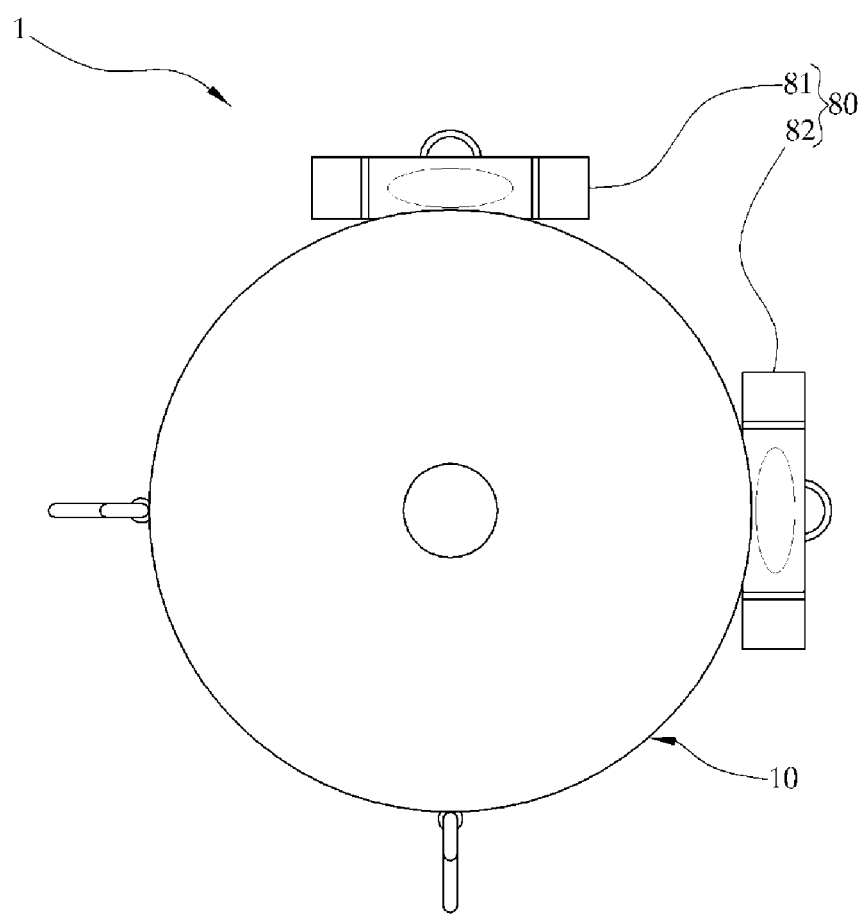
FIG. 11 is a plan view showing a top surface of a section marking apparatus for geological survey shown in FIG. 10.

FIG. 10 is a perspective view showing a structure of a section marking apparatus 1 for geological survey in accordance with another embodiment of the present invention. FIG. 11 is a plan view showing a top surface of a section marking apparatus 1 for geological survey shown in FIG. 10.

Referring to FIG. 10 and FIG. 11, the section marking apparatus 1 for a geological survey may further include a level adjusting unit 80.

The level adjusting unit 80 allows the section marking apparatus 1 to be secured to the ground surface in a state where the section marking apparatus 1 is not inclined but parallel to a horizontal plane when the section marking apparatus 1 is provided on the ground surface. As one example, the level adjusting unit 80 may include a first level 81 and a second level 82. The first level 81 is provided on one side of the side part 12 of the case part 10 and may be directed in the first lateral direction. The second level 82 is provided on the other side of the side part 12 of the case part 10 and may be directed in the second lateral direction which is perpendicular to the first lateral direction. As the first level 81 and the second level 82, a manual type level which works by checking whether a bubble in a liquid contained in a transparent tube is located within gradations marked on the transparent tube may be employed, and a digital level may be utilized.

As described above, if the section marking apparatus 1 is provided with the level adjusting unit 80, when the section marking apparatus 1 is installed on the ground surface, the user may secure the section marking apparatus 1 to the ground surface while the user checks the first level 81 and the second level 82, and so the section marking apparatus 1 may be secured on the ground surface without any inclination.

Figure 12:
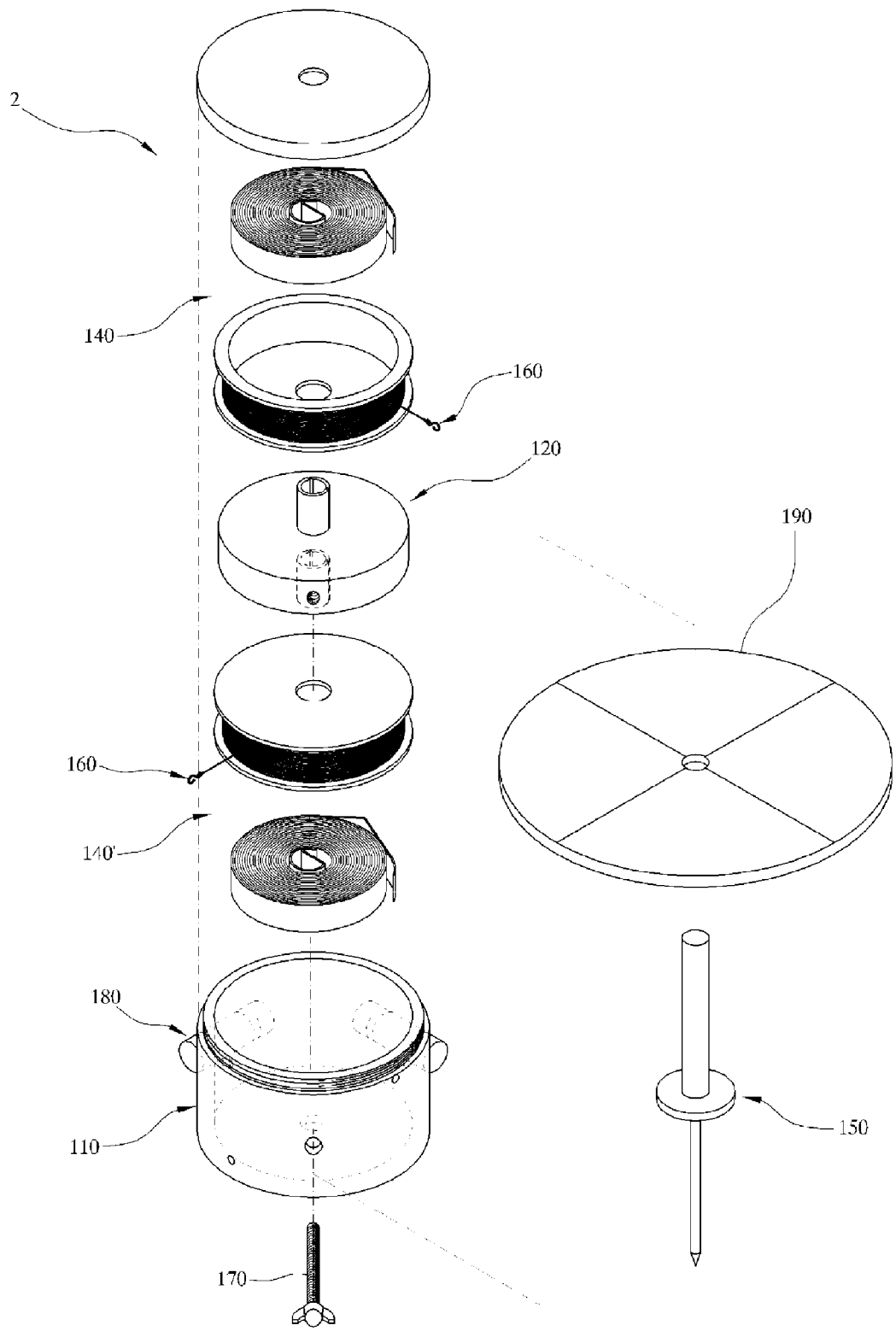
FIG. 12 is an exploded perspective view for illustrating a section marking apparatus for geological survey according to a second embodiment of the present invention.

FIG. 12 is an exploded perspective view for illustrating a section marking apparatus 2 according to another embodiment.

Referring to FIG. 12, a section marking apparatus 2 according to a second embodiment of the present invention may include a case part 110, a fixing shaft part 120, section marking parts 140, 140', a driving pin part 150, a connecting part 160, a securing bolt 170, a level adjusting unit 180, and a marker string guiding part 190.

The structures of the case part 110, the fixing shaft part 120, the section marking parts 140 and 140', the driving pin part 150, the connecting part 160, the securing bolt 170, and the level adjusting unit 180 included in the section marking apparatus 2 according to the second embodiment of the present invention are substantially the same as or similar to those of the case part 10, the fixing shaft part 20, the section marking parts 40, 40', the driving pin part 50, the connecting part 60, the securing bolt 70, and the level adjusting unit 80 of the section marking apparatus 1 according to the first embodiment of the present invention, which are described above with reference to FIG. 1 to FIG. 11. Thus, for a detailed description of these elements, refer to the description regarding FIG. 1 to FIG. 11.

The marker string guiding part 190 may guide extraction directions of the first and second marker strings to enable the first marker string to be extracted perpendicular to the direction in which the second marker string is extracted. The marker string guiding part 190 is secured between the bottom part of the case part 110 and a supporting plate of the driving pin part 150, and may have a shape of a circular plate having a diameter larger than the bottom part of the case part 110. The marker string guiding part 190 may have a hole formed at a center thereof to allow a striking rod of the driving pin part 150 to pass through the hole. On an upper surface of the marker string guiding part 190, in addition, a first line indicating the extraction direction of the first marker string, a second line indicating the extraction direction of the second marker string, and a third line and a fourth line for verifying the extraction directions of the first and second marker strings of the neighboring section marking apparatuses may be formed. The first, second, third, and fourth lines may be extending in the mutually perpendicular directions with respect to a hole through which the striking rod passes.

According to the section marking apparatus for geological survey in accordance with exemplary embodiments, both when the ground surface is flat and when it is uneven or has a slope so that it is difficult to grasp a section area, the processes for dividing a geological survey site and marking the sections may be easily executed. In addition, in accordance with some embodiments, the section marking apparatus is advantageous in that it is easy to install and remove, and it is possible to horizontally secure the section marking apparatus to the ground surface without any inclination.

Although exemplary embodiments have been described it will be readily understood by those skilled in the art that various modifications and changes can be made thereto without departing from the spirit and scope of the present disclosure defined by the appended claims.

What is claimed is:

1. A section marking apparatus for dividing a geological survey site into one or more sections, the apparatus comprising:
    a case part having a first internal space formed therein;
    a fixing shaft part accommodated in the first internal space to divide the first internal space;
    a first section marking part accommodated in the first internal space and disposed above the fixing shaft part, the first section marking part including a first marker string configured to be extracted to the outside of the case part;
    a second section marking part accommodated in the first internal space and disposed below the fixing shaft part, the second section marking part including a second marker string configured to be extracted to the outside of the case part; and
    a driving pin part including a striking rod extending through the case part and the fixing shaft part, a supporting plate formed at one end portion of the striking rod to support a bottom part of the case part, and a driving pin extending from the supporting plate and configured to be inserted into the site,
    wherein the bottom part of the case part comprises a hole through which the striking rod extended.

2. The section marking apparatus of claim 1, wherein the case part comprises:
    the bottom part;
    a side part extending vertically from an edge of the bottom part, the side part having a first extraction hole for extracting the first marker string and a second extraction hole for extracting the second marker string; and
    a cover part detachably coupled to an upper end portion of the side part and comprising a hole through which the striking rod extends.

3. The section marking apparatus of claim 1, further comprising a connecting part for connecting the section marking apparatus to another section marking apparatus, the connecting part comprising:
    first and second connecting hooks provided at end portions of the first and second marker strings, respectively;
    a first hook connecting ring coupled to a portion of an outer surface of the case part opposite to a portion from which the first marker string is configured to be extracted; and
    a second hook connecting ring coupled to a portion of the outer surface of the case part opposite to a portion from which the second marker string is configured to be extracted.

4. The section marking apparatus of claim 1, further comprising a level adjusting unit coupled to a side part of the case part, the level adjusting unit comprising:
    a first level coupled to an outer surface of the side part of the case part and extending in a first direction; and
    a second level coupled to an outer surface of the side part of the case part and extending in a second direction which is perpendicular to the first direction.

5. The section marking apparatus of claim 4, further comprising a marker string guiding part, the marker string guiding part being secured between a bottom part of the case part and the supporting plate of the driving pin part, and having a shape of a circular plate and having a size larger than the bottom part of the case part, wherein the marker string guiding part has an upper surface on which a first line guiding an extraction direction of the first marker string and a second line guiding an extraction direction of the second marker string are formed.

6. A section marking apparatus for dividing a geological survey site into one or more sections, the apparatus comprising:
    a case part having a first internal space formed therein;
    a fixing shaft part accommodated in the first internal space to divide the first internal space;
    a first section marking part accommodated in the first internal space and disposed above the fixing shaft part, the first section marking part including a first marker string configured to be extracted to the outside of the case part;
    a second section marking part accommodated in the first internal space and disposed below the fixing shaft part, the second section marking part including a second marker string configured to be extracted to the outside of the case part; and
    a driving pin part including a striking rod extending through the case part and the fixing shaft part, a supporting plate formed at one end portion of the striking rod to support a bottom part of the case part, and a driving pin extending from the supporting plate and configured to be inserted into the site,
    wherein the fixing shaft part comprises:
    a partition dividing the first internal space into the two spaces and having a first hole through which the striking rod extends;
    an upper axial pipe protruding upward from an upper surface of the partition and having a second hole in communication with the first hole to enable the striking rod to extend therethrough; and
    a lower axial pipe protruding downward from a lower surface of the partition and having a third hole in communication with the first hole to enable the striking rod to extend therethrough.

7. The section marking apparatus of claim 6, wherein the first section marking part comprises:

a first drum having a first bottom part provided with a hole through which the upper axial pipe extends, and a first winding part extending from an edge of the first bottom part and being substantially perpendicular to the first bottom part;
the first marker string wound around an outer surface of the first winding part; and
a first restoring spring accommodated in a space formed by an inner surface of the first winding part and having a first end portion coupled to the upper axial pipe and a second end portion coupled to the first marker string, and
wherein the second section marking part comprises:
a second drum having a second bottom part provided with a hole through which the lower axial pipe extends, and a second winding part extending from an edge of the second bottom part and being substantially perpendicular to the second bottom part;
the second marker string wound around an outer surface of the second winding part; and
a second restoring spring accommodated in a space formed by an inner surface of the second winding part and having a first end portion coupled to the lower axial pipe and a second end portion coupled to the second marker string.

8. The section marking apparatus of claim 6, further comprising:
a securing bolt extending through the side part of the case part and coupled to the partition.

9. A section marking apparatus comprising:
a case part comprising a first extraction hole and defining a first internal space;
a fixing shaft part accommodated in the first internal space and comprising an upper axial pipe;
a first section marking part accommodated in the first internal space and comprising:
a first drum comprising a first winding part and defining a hole through which the upper axial pipe extends;
a first marker string wound around an outer surface of the first winding part and configured to be extracted to the outside of the case part through the first extraction hole; and
a first restoring spring accommodated in a space formed by an inner surface of the first winding part and having a first end portion coupled to the upper axial pipe and a second end portion coupled to the first marker string.

10. The section marking apparatus of claim 9, wherein the case part further comprises a second extraction hole, wherein the fixing shaft part further comprises a lower axial pipe, and wherein the section marking apparatus further comprises:
a second section marking part comprising:
a second drum comprising a second winding part and a hole through which the lower axial pipe extends;
a second marker string wound around an outer surface of the second winding part and configured to be extracted to the outside of the case part through the second extraction hole; and
a second restoring spring accommodated in a space formed by an inner surface of the second winding part and having a first end portion coupled to the lower axial pipe and a second end portion coupled to the second marker string.

11. The section marking apparatus of claim 9, further comprising:
a driving pin part comprising:
a striking rod extending through the case part, the fixing shaft part, and the first section marking part;
a supporting plate formed at one end portion of the striking rod to support a bottom part of the case part; and
a driving pin extending from the supporting plate and configured to be inserted into a ground surface.

12. The section marking apparatus of claim 11, further comprising:
a marker string guiding part positioned between the bottom part of the case part and the supporting plate of the driving pin part, wherein the marker string guiding part comprises an upper surface on which a first line guiding an extraction direction of the first marker string is formed.

13. The section marking apparatus of claim 9, further comprising:
a connecting part for connecting the section marking apparatus to another section marking apparatus, the connecting part comprising:
a first connecting hook provided at an end portion of the first marker string; and
a first hook connecting ring coupled to a portion of an outer surface of the case part.

14. The section marking apparatus of claim 9, further comprising:
a securing bolt extending through a side part of the case part and coupled to the fixing shaft part.

15. The section marking apparatus of claim 9, further comprising:
a first level coupled to an outer surface of a side part of the case part.

16. A method for dividing a site into one or more sections using a first section marking apparatus, the method comprising:
extracting a first marker string from a first extraction hole in a case part of the first section marking apparatus, wherein the case part accommodates a first drum and a first restoring spring, wherein the first restoring spring is coupled to the first marker string, and wherein the extracting the first marker string comprises unwinding the first marker string from around an outer surface of the first drum by overcoming a first restoration force of the first restoring spring; and
connecting an end portion of the first marker string to a second section marking apparatus,
wherein the case part further accommodates a fixing shaft part comprising an upper axial pipe, wherein the first drum comprises a hole through which the upper axial pipe extends, wherein a first end portion of the first restoring spring is coupled to the upper axial pipe, and wherein a second end portion of the first restoring spring is coupled to the first marker string.

17. The method of claim 16, further comprising:
extracting a second marker string from a second extraction hole in the case part, wherein the case part further accommodates a second drum and a second restoring spring, wherein the second restoring spring is coupled to the second marker string, and wherein the extracting the second marker string comprises unwinding the second marker string from around an outer surface of the second drum by overcoming a second restoration force of the second restoring spring; and
connecting an end portion of the second marker string to a third section marking apparatus.

18. The method of claim 16, wherein the first section marking apparatus further comprises a driving pin part, wherein the driving pin part comprises a striking rod extending through the case part, a supporting plate formed at one end portion of the striking rod to support a bottom part of the case part, and a driving pin extending from the supporting plate, and wherein the method further comprises:

striking the striking rod of the driving pin part to drive the driving pin into a ground surface.

19. The method of claim 16, wherein the end portion of the first marker string comprises a first connecting hook, wherein the second section marking apparatus comprises a first hook connecting ring, and wherein the connecting the end portion comprises connecting the first connecting hook to the first hook connecting ring.

* * * * *